United States Patent [19]

Thackery

[11] 4,211,265

[45] Jul. 8, 1980

[54] LOG SPLITTING APPARATUS

[76] Inventor: Russell H. Thackery, 2376 Brentwood Rd., Columbus, Ohio 43209

[21] Appl. No.: 874,414

[22] Filed: Feb. 2, 1978

[51] Int. Cl.$^2$ .......................... B27L 7/00; A47J 49/02

[52] U.S. Cl. .................................. 144/194; 74/15.63; 180/53 R; 144/193 R

[58] Field of Search ................ 180/14 R, 53 R, 53 D, 180/53 WA, 53 FE; 74/13, 15.6, 15.63, 15, 15.69, 11; 403/108, 379; 144/2 N, 193 R, 193 A, 194

[56] References Cited

U.S. PATENT DOCUMENTS

| | | | |
|---|---|---|---|
| 2,927,613 | 3/1960 | Franzen et al. | 144/2 N |
| 3,007,535 | 11/1961 | Lippke | 180/53 D |
| 3,938,567 | 2/1976 | Dircksen | 144/193 A |
| 4,027,709 | 6/1977 | Thackery | 144/193 R |
| 4,091,851 | 5/1978 | Ober | 144/193 R |
| 4,132,255 | 1/1979 | Thackery | 144/193 R |

FOREIGN PATENT DOCUMENTS

| | | | |
|---|---|---|---|
| 182212 | 10/1954 | Fed. Rep. of Germany | 144/193 R |
| 2014366 | 10/1971 | Fed. Rep. of Germany | 180/53 R |

*Primary Examiner*—Robert Louis Spruill

*Assistant Examiner*—W. D. Bray

*Attorney, Agent, or Firm*—Robert E. Stebens

[57] ABSTRACT

A log splitting apparatus having a spiral-threaded, conical-surface splitter head is provided including a housing for supporting the splitter head in mechanically coupled, driving relationship to a power source. A log stop bar assembly is mounted on the support housing to extend in spaced parallel relationship to the conical surface of the splitter head forming a throat of constant width for passage of a log therebetween. Mounting of the stop bar is effected by a ring rotatable on the housing to selected angular positions and a telescopic structure providing selective adjustment of the width of the throat. The apparatus is adapted for mounting on a vehicle having an output power shaft to which the splitter is coupled. Bearing means are included in the housing with a splitter head supporting drive shaft journalled therein. In one embodiment, the housing is adapted for fixed mounting on the power source vehicle. In a second embodiment, the housing is designed for interconnection with a vertical lifting mechanism of the vehicle with the splitter head shaft axially displaceable through the housing thereby enabling the lift mechanism to function in vertically displacing the splitter head to a desired elevation.

18 Claims, 7 Drawing Figures

LOG SPLITTING APPARATUS

BACKGROUND OF THE INVENTION

Log splitting apparatus of the type to which this invention is directed includes a splitter head which comprises a conically shaped structure having a spiral thread formed on the conical shaped surface. The head is mounted on a drive shaft for obtaining rotational drive power from a suitable power source thereby enabling the splitter head to thread itself into a log and effect splitting by a wedge action. The previously provided structures have included various types and configurations of mounting assemblies for effecting transfer of the rotational drive power to the splitter head drive shaft. A common type of interconnection is the mechanical coupling with a drive wheel of a vehicle that is supported out of contact with the ground. The objective of this type of mounting assembly is to facilitate mobility of the apparatus and transport to a utilization site.

The log splitting apparatus of this invention is specifically directed to utilization and incorporation with a transport vehicle of an agricultural tractor type, which is customarily provided with a power take-off drive shaft. This shaft is normally arranged in conjunction with the rear axle differential housing to provide rotating shaft power to equipment that is either carried at the rear of the tractor or is mounted on a trailable vehicle towed by the tractor. One embodiment of this invention is designed specifically for fixed mounting on the rear axle differential housing and is thus rigidly supported for utilization in log splitting operations. A second embodiment of the invention incorporates a support housing assembly which is specifically adapted for mounting on a power lift mechanism that is provided on certain types of agricultural tractors. This power lift mechanism, with which the present invention is designed to cooperate, is of a type having lifting arms that are pivoted on the rear axle and are selectively actuated by either a hydraulic or mechanical driven mechanism for positioning and support of lifting arms at a desired elevation and angular position. The mountings of both embodiments of this invention are of a type which facilitates the transport of the apparatus in that the equipment is mounted on the vehicle and is operationally effective at any desired time without any requirement for further mounting and positioning of the equipment at the utilization site.

SUMMARY OF THE INVENTION

A log splitting apparatus is provided in a first embodiment of this invention for direct, fixed mounting on a rear axle differential of an agricultural type tractor. This embodiment of the invention includes a support housing assembly including an elongated cylindrical tube provided with a bolt flange for coupling of the unit to the differential housing. This cylindrical tube is provided with bearings in which an elongated drive shaft is journalled with the drive shaft carrying the conically-shaped, spiral-threaded splitter head at one end. Coupling means is provided at the opposite end of this drive shaft for mechanical interengagement with a power take-off output shaft of the tractor or power vehicle.

Mounted on the cylindrical tube of the support housing assembly is a log stop bar assembly which includes an elongated stop bar supported to extend axially with respect to the splitter head and in spaced parallel relationship to the tapered conical surface thereof. The assembly for attachment of the elongated stop bar includes means to permit interchange of the stop bar from one side to the other of the splitter head to enable the apparatus to accommodate opposite directions of rotation of the tractor output shaft. This attachment also includes a telescopic tube mechanism to permit selective adjustment of the spacing between the splitter head and stop bar to accommodate different sized logs.

The second embodiment of the log splitting apparatus provided by this invention is designed for mounting and support on a power lift mechanism such as the well known conventional three point type equipment mounting with which a tractor type vehicle may be provided. The power lift mechanism includes a pair of elongated arms pivoted to the tractor frame structure and extending a distance rearwardly therefrom. Carried by the lift arms which form two points of the three point mounting is a base supporting bar which is included in the support housing assembly and thus enables the assembly to be swung in a vertical plane as a consequence of pivoting of the lift arms by the powered lifting mechanism connected therewith. The splitter head is carried on an elongated drive shaft which is journalled in bearings carried by the support housing assembly and which is axially displaceable with respect to that housing assembly. One end of this drive shaft is provided with a coupling device for interengaging the splitter head drive shaft in driving relationship to the power takeoff shaft of the tractor and forms the third point of the mounting. The axially reciprocal mounting of the shaft in the support housing enables the structure to be pivoted or swung in a vertical plane in accordance with the movement of the power lift mechanism. However, the shaft being supported in the relatively elongated support housing, and in cooperation with coupling to the power take off shaft, effectively restrains the lift arms against their normal lateral swaying in a horizontal plane. Such horizontal swaying of the apparatus is particularly undesireable for log splitting operations and this apparatus is effective in maintaining the splitter head aligned with a fixed longitudinal axis. A log stop bar assembly of the same construction as provided in the first embodiment is mounted on a support housing assembly of the second embodiment. It is this novel cooperative arrangement utilizing only two points of a conventional three-point type equipment mounting and substituting the splitter head shaft for the third point that results in a structure achieving the desired structural integrity but is economical to manufacture and is convenient and easy to mount.

The two embodiments of this invention are specifically designed to enable a log splitter apparatus of this type to be readily transported to the utilization site. The apparatus, which can be mounted on the vehicle at a convenient storage location, requires no further assembly or set-up at the utilization site to enable operation of the equipment. This feature is particularly advantageous in attaining convenience of operation and avoiding having time spent at the utilization site to finish assembly of the apparatus to a driving mechanism.

The log stop bar assembly, as provided with this invention is also specifically designed to position a log stop bar in proper relationship to the splitter head for most convenient operation in the positioning of a log in supported relationship to the splitter head. In accordance with this invention, an elongated stop bar is carried to extend in parallel relationship to the conical surface of the splitter head and at an angular position, with respect to the axis thereof, to be below a horizontal plane extending to that longitudinal axis. The specific angular position is selected to place the elongated stop bar at a location which is particularly convenient for enabling a person to place the log against the point of the splitter head and in supported relationship on the elongated stop bar.

These, and other objects and advantages of this invention, will be readily apparent from the following detailed description of illustrative embodiments thereof and the accompanying drawings.

DESCRIPTION OF THE DRAWING FIGURES

DESCRIPTION OF THE ILLUSTRATIVE EMBODIMENT

Figure 3:
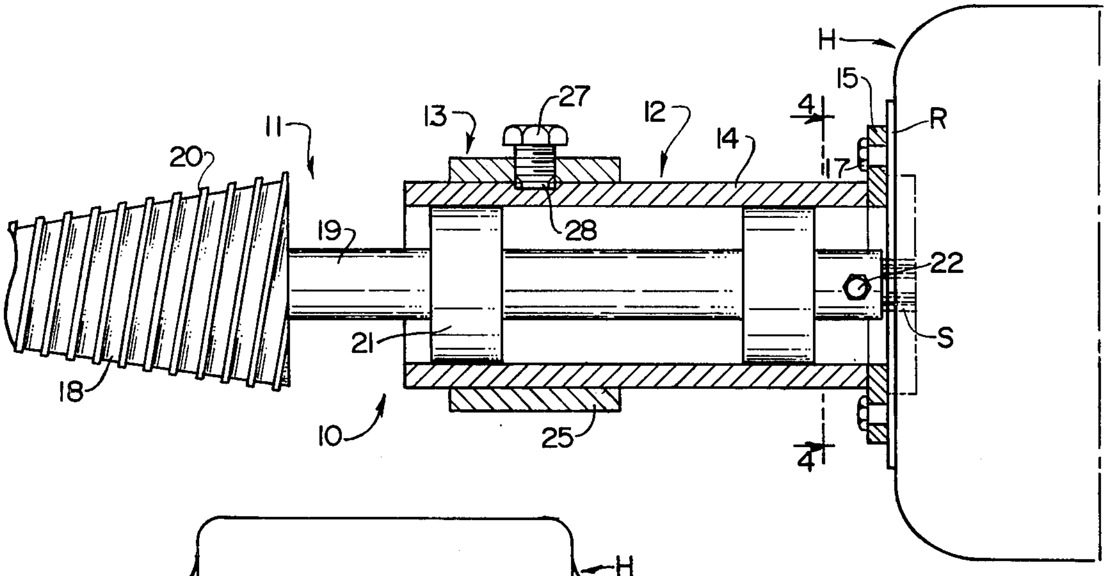
FIG. 3 is a vertical sectional view taken along line 3—3 of FIG. 1.

Having reference to FIGS. 1 through 4, an embodiment of the invention is illustrated that is designed specifically for direct and fixed attachment or mounting on a tractor type vehicle. The log splitting apparatus in its general entirety is designated by the numeral 10 and is shown as mounted on a differential housing H of an agricultural type tractor with which the invention is intended to be utilized. Only the differential housing H is partially indicated as the remainder of the tractor structure is immaterial to the functioning and operation of the log splitting apparatus. In general, a differential housing H of this type includes the structural frame or casing having a mounting ring R for the attachment of equipment and from which a power output shaft S extends for mechanical coupling with any desired driven apparatus. The mounting ring R is illustrated as being integrally formed in the cast differential housing and includes a plurality of threaded bolt holes into which attaching cap screws of a driven apparatus may be secured. It will be understood that the differential housing H is also provided with appropriate internal gearing mechanisms for interconnecting the power output shaft S to the engine and that appropriate control mechanisms would also be provided for selective engagement or disengagement of the gearing mechanism. Those control mechanisms enable the operator to engage or disengage the power output shaft S with the engine. The specifics of the power train to the output shaft S are not a part of this invention other than to indicate the utilization of this embodiment of the apparatus.

The log splitting apparatus 10, as illustrated in FIGS. 1 through 4, includes a splitter head assembly 11, a support housing assembly 12 and a stop bar assembly 13. Considering first the support housing assembly 12, it will be seen that in these figures this housing includes an elongated cylindrical tube 14 which is open at either end. Provided at the one end of the tube 14 is a bolt mounting flange 15 which is formed as an annular ring of a diameter to cooperatively interfit with the mounting ring R of the differential housing H. Formed in the flange 15 and angularly spaced around a bolt circle are a number of bolt holes 16 which are designed to align with respective bolt sockets provided in the mounting ring R. Attachment of the apparatus is readily effected through utilization of cap screws 17 which are inserted through appropriate bolt holes 16 and threaded into the sockets in the differential housing. Preferably, the number of bolt holes 16 and their angular displacement is determined in accordance with the general standard configurations of the mounting rings R that are utilized with the presently manufactured differential housings. With this structural configuration, it will be seen in the several figures that the support housing assembly 12 is thus readily mountable on the differential housing in fixed relationship thereto. As mounted, the cylindrical tube 14 will project axially rearward of the differential housing and it will be understood that with agricultural tractor equipment, the tube is thus projecting into an open space at the rear of or between the rear wheels of the tractor for utilization of the attached equipment.

Forming the splitter head assembly 11 is a conically shaped splitter head 18 which is mounted on an elongated supporting drive shaft 19. As is well known with apparatus of this type, the splitter head 18 is provided with a spiral thread 20 in the form of a screw and is thus adapted for threading itself into a log to effect the splitting of the log through the wedge shaped operation of the splitter head. Support of the splitter head assembly 11 is effected by extending the drive shaft 19 axially through the cylindrical tube 14 of the housing assembly with the shaft being journalled in bearing elements 21. Two such bearing elements 21 are shown in the illustrative structure and these elements are located in axially spaced relationship and secured within the interior of the tube 14. Suitable sealing elements are preferably incorporated in the bearing elements 21 to prevent entrance of moisture or debris which could damage the bearings. Mechanical coupling of the drive shaft 19 to the power output shaft S is readily effected by forming a splined socket extending axially inward of the end of the drive shaft. This splined socket, which is not otherwise illustrated, is seen to coaxially receive the mating spline configurations formed on the terminal end of the customarily provided power output shafts.

Securing of the shaft 19 of the splitter head assembly in driving relationship can be effected by either of two conventional techniques. One such technique is the fixing of the shaft 19 against axial displacement in the bearing elements 21. Alternatively, the shaft 19 may be secured in driving relationship through use of a connector bolt 22 which extends radially through the mating portions of the shaft 19 and power output shaft S. When utilizing a connector bolt means of interconnection, it will be readily apparent that the assembly and mounting of the apparatus on the tractor is accomplished by first extending the shaft 19 a distance outwardly of the tube 14 with respect to the bolt mounting flange 15. At this time, the shafts are intercepted and the bolt 22 inserted therein. Subsequently, the support housing assembly will be slid axially on the shaft 19 to bring the mounting flange 15 into engagement with the mounting ring R on the differential housing H and the cap screws 17 inserted in the respective holes for fixing the housing assembly onto the tractor. For convenience in assembly, the connector bolt 22 may be of the type having a retaining pin 23 to prevent removal of the bolt from the shaft. The retaining pin is of the spring-clip type which avoids the necessity of utilizing threaded fastening elements.

Figure 2:
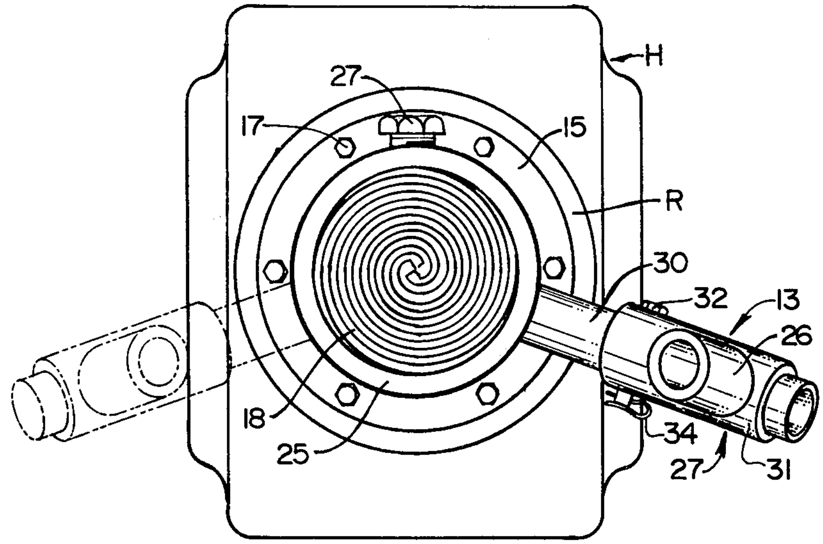
FIG. 2 is an end elevational view of the apparatus shown in FIG. 1 and illustrating alternative positioning of the log stop bar assembly.

Secured on the support housing assembly 12 is the log stop bar assembly 13. This log stop bar assembly includes a circular collar 25 on which is carried an elongated stop bar 26. The collar 25 comprises a relatively short section of a cylindrical tube having an internal diameter substantially equal to the outside diameter of the housing assembly tube 14. Thus, the collar 25 may be slipped onto the tube 14 and axially positioned at the proper location while permitting selective rotational movement about the tube. Securing the collar 25 in a fixed position on the tube 14 is a set screw 27 which is threaded into the collar and projects radially inward thereof to extend into a selected one of a plurality of receiving sockets 28 formed in the outer peripheral surface of the housing assembly tube 14. This securing of the collar is best seen in FIG. 3 and it will be understood that the collar may be revolved about the tube 14 to other positions and fixed in a selected position through provision of the additional sockets 28 for cooperation with the set screws 27. These angular positions for the several sockets 28 are not otherwise illustrated except as indicated in FIG. 2 where the stop bar assembly is shown in broken lines as disposed in an alternate position.

Attachment of the elongated stop bar 26 to the collar 25 is effected through a telescopic tube mechanism 29. This telescopic tube mechanism 29 includes a laterally projecting tube 30 which is secured at one end to the collar 25 and projects in a generally radially outward direction. Telescopically mounted for sliding movement on the tube 30 is a relatively shorter tubular section 31 and this section is selectively positioned axially along the other tube at any one of several predetermined positions. Securing of the telescopic tubes in a preferred position for convenience of adjustability is effected by means of a connector bolt 32 which passes through aligned apertures formed in the two tubes. A single aligned pair of holes or apertures are formed in the shorter tubular section 31 while a number of such apertures indicated at 33 are formed in the elongated tube 30 in longitudinal spaced relationship. The tubes must thus be axially positioned at a selected position and the connector bolt 32 inserted through the respective aligned apertures with the bolt retained therein by means of a spring clip-type retaining pin 34.

The elongated stop bar 26, which is illustrated as being formed from a cylindrical tube, is rigidly secured to the shorter tubular section 31 as by welding. In the illustrative embodiment and referring specifically to FIG. 1, with the assembly 13 properly positioned on the housing assembly 12, the stop bar 26 is preferably of a length to extend a distance axially beyond the apex of the splitter head 18. This greater length of the stop bar thus enables a log to be first positioned on the bar before forcing it axially into engagement with the apex or terminal end of the splitter head. It will also be noted in FIG. 1 that the relative arrangement of the telescopic tube mechanism 29 and its support of the stop bar 26 is such that the bar 26 will extend in generally parallel relationship to the outer conical surface of the splitter head. This arrangement is further emphasized and illustrated in FIG. 2 wherein it will be noted that the telescopic tube mechanism is supported by means of the attaching collar 25 to project downwardly at an angular position to maintain the bar at an elevation slightly below a horizontal plane extending through the splitter head. Preferably, this downward inclination of the support for the stop bar is of the order of 20–30 degrees below a horizontal plane and has been found to provide the best location for the stop bar in facilitating positioning of a log on the bar at interengagement with splittler head. However, adjustment of the angular position of the stop bar 26 may be readily achieved by securing the set screw 27 in a different socket 28 for the convenience of the operator.

This structural embodiment of the log splitting apparatus, as previously indicated, is designed to permit and facilitate operation and accommodation of the apparatus to rotation of the power output shaft S of the tractor in either direction. For this purpose the stop bar assembly 13 is designed to enable it to be revolved around the support housing 12 to position that stop bar 26 at either side. This is diagrammatically illustrated in FIG. 2 where the stop bar assembly is shown in broken lines at the alternate location for opposite rotation. It is for this purpose that additional sockets 28 are formed in the tube 14 for receiving the set screw 27 with another socket formed at the indicated point of location of the set screw 27 in the broken line illustration FIG. 2. It will be understood that, with an opposite direction of rotation, the splitter head 18 would necessarily be interchanged for one having a thread 20 which is of the opposite hand. In the usual fabrication of the apparatus, the splitter head is removable from its drive shaft 19 and thus by merely providing splitter heads for either direction or rotation, the appratus can be readily adapted to a tractor apparatus regardless of the direction of rotation of its power output shaft S.

Figure 1:
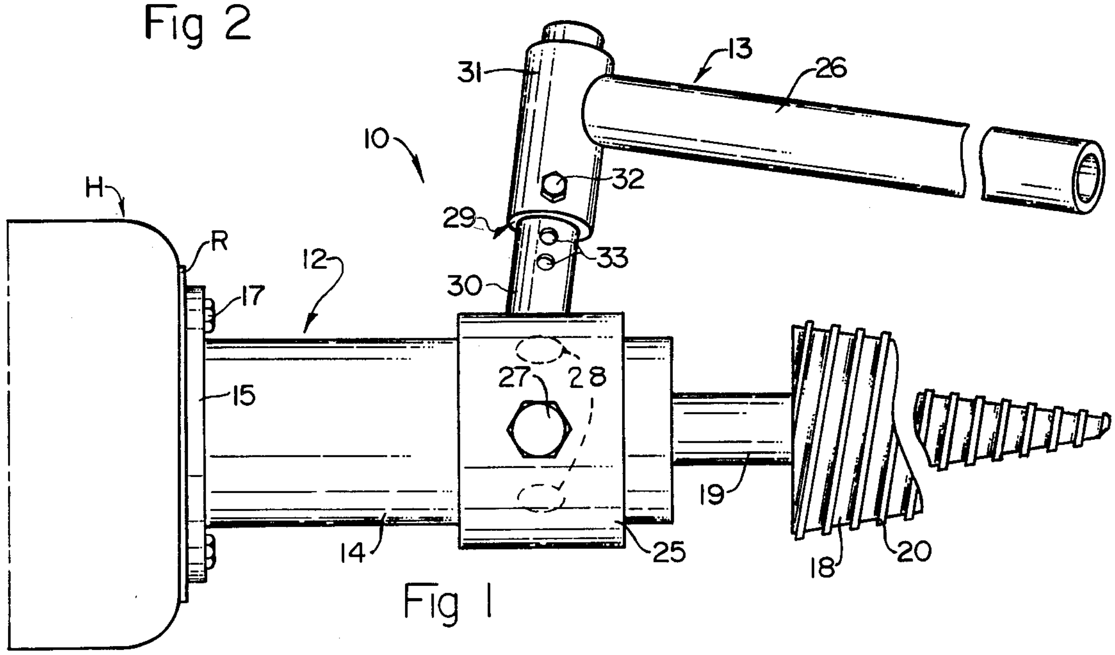
FIG. 1 is a top plan view of a log splitting apparatus embodying the fixed support housing assembly of this invention.

Connection of the tube 30 of the telescopic tube mechanism 29 to the mounting collar 25 is preferably effected at an angular position such as that best seen in FIG. 1. The purpose of this angular mounting of the tube 30 is to enable the stop bar 26 to be welded to the tube 31 at right angles. This technique facilitates the fabrication of the assembly but it will be understood that the arrangement may be reversed with the tube 30 secured at right angles to the collar and the bar 26 secured at an angle to the tubular section 31.

Figure 5:
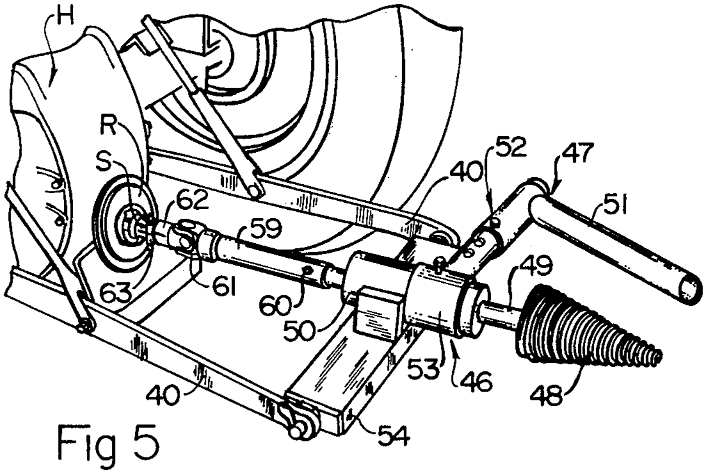
FIG. 5 is a perspective view of a modified embodiment of the log splitting apparatus adapted for mounting on a tractor lift mechanism.
Figure 4:
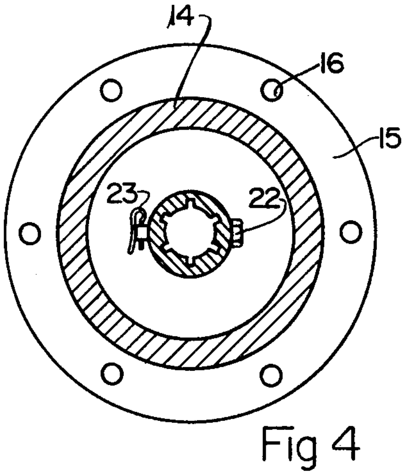
FIG. 4 is a vertical sectional view taken along line 4—4 of FIG. 3.
Figure 6:
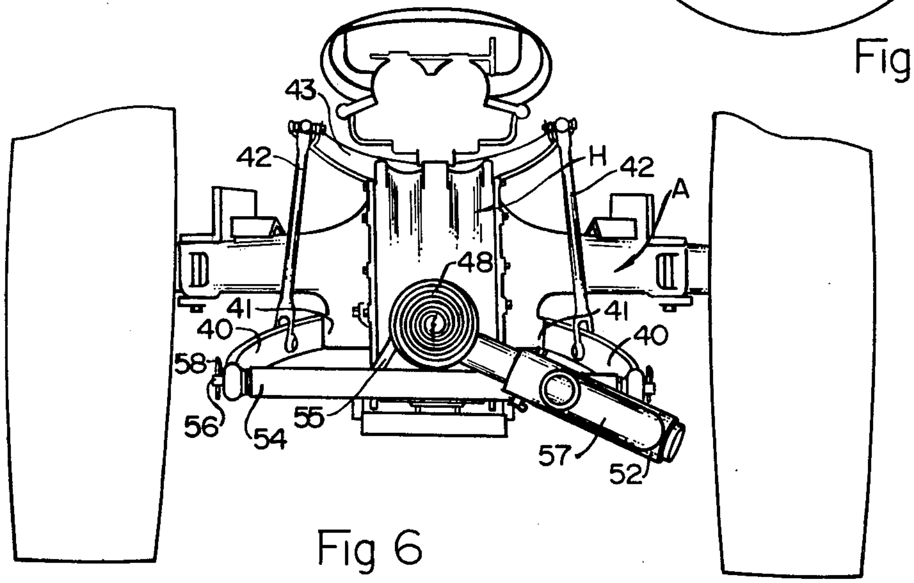
FIG. 6 is an end elevational view of the modified embodiment.
Figure 7:
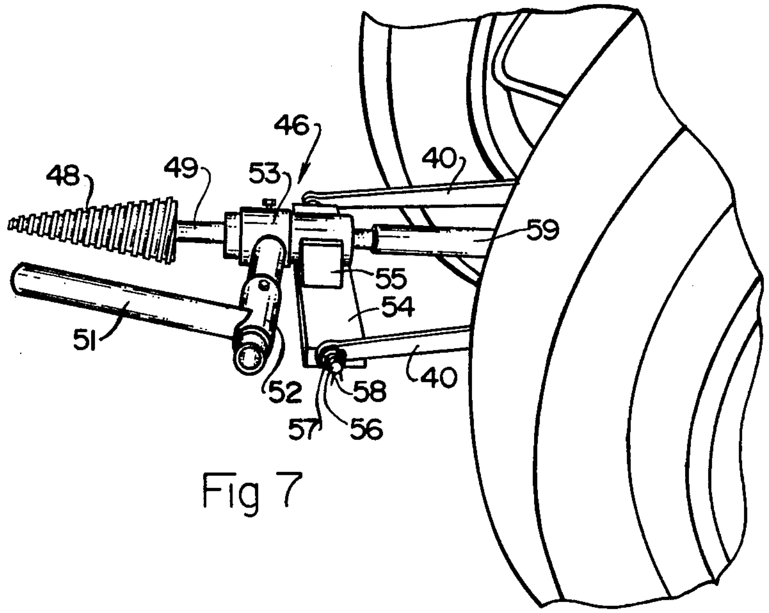
FIG. 7 is a perspective view of the modified embodiment as seen from the side opposite to that of FIG. 6.

A modified form of the log splitting apparatus is shown in FIGS. 5, 6 and 7. This modified form of the apparatus is specifically designed for utilization in mounting on a power lift mechanism of the well known three-point mounting type that is often provided on agricultural type tractors of this general type. As can be seen in these figures, the tractor assembly includes, in addition to the differential housing H, a rear axle assembly A to which the power lift mechanism is attached. Included in the power lift mechanism are a pair of longitudinally extending arms 40 which are pivoted at one end to brackets 41 carried by the rear axle assembly and form two-points of the three-point mount. These two arms 40 are positioned in laterally spaced relationship at either side of the differential housing H and project a distance rearwardly therefrom. Power actuation of the arms 40 is accomplished by lifting rods 42 that are connected to each of the respective arms. These rods 42 are pivotally connected at their lower ends to the respective arm 40 at an intermediate point thereof and the upper ends of the rods 42 are secured to an actuating mechanism which is only generally indicated at 43. It will be understood that this lifting mechanism is designed for power operation through the drive system and engine of the tractor. Suitable controls are necessarily provided for controlling the operation thereof. As is well known, the operator may selectively position these controls and actuate them to vertically swing the lifting arms 40 to the desired angular position.

The modified log splitting apparatus, as shown in FIGS. 5, 6 and 7, includes the same basic components as the first described embodiment but are re-numbered for convenience of description as the splitter head assembly 45, support housing assembly 46, and stop bar assembly 47. These several structural components and assemblies are very similar to those previously described in conjunction with first embodiment and, where the structures are identical, reference may also be had to the preceding description of the first embodiment. Regarding the splitter head assembly 45, it will be seen that this structure also includes a conically shaped splitter head 48 that is mounted on an elongated supporting drive shaft 49. This drive shaft is journalled in bearing elements (not shown) that are incorporated in an elongated cylindrical tube 50 included in the support housing assembly 46 and in which bearing elements shaft 49 is axially displaceable. The stop bar assembly 47 is identical with that previously described and is designed for mounting on the cylindrical tube 50 of the housing assembly in the same manner for the same objectives. Thus, it will be seen that the stop bar assembly includes an elongated stop bar 51 interconnected by a telescopic tube mechanism 52 to the cylindrical tube 50 of the housing assembly. The mounting structure again includes a circular collar 53 that is adapted for mounting on the cylindrical tube 50 for selected positioning at either side of the splitter head 48.

Also included in the support housing assembly 46 is a base bar 54 which is secured to the cylindrical tube 50 as by welding and may be provided with reinforcing brackets 55 located at either side of the cylindrical tube. This structural arrangement results in relatively rigid device that is capable of withstanding the shock forces that are encountered in operation of the apparatus in the splitting of logs. Each end of the base bar 54 is provided with longitudinally extending trunions 56 with each of the trunions journalled in a bearing socket 57 carried at the outer end of a respective lifting arm 40 which comprise two points of the three-point mounting. Securing the trunions in the respective bearing sockets 57 are spring type retaining clips 58 which are selectively insertable in respective apertures formed in the extreme ends of the trunions 56 projecting outwardly of the lifting arms. With this arrangement, it will be seen that the base bar 54 is relatively pivotable about a horizontal axis extending through the bearing sockets 57. Accordingly, the cylindrical tube, as well as the splitter head 48 and its associated drive shaft 49, are also capable of relative pivoting movement about this horizontal axis in a vertical plane.

Completing mechanical connections of the splitter head drive shaft 49 to the power output shaft S of the tractor differential housing H is a shaft extension 59 which is coupled in fixed relationship to the end of the splitter head shaft 49. This mechanical connection may be effected by a telescopic splined tube arrangement or utilization of a connector bolt 60 extending through aligned apertures in the telescopically assembled shafts. The connector bolt 60 may also be utilized to secure the splined shaft arrangement against axial displacement. The opposite end of the shaft extension 59, is provided with a universal joint 61 having an end element 62 formed with an internal splined socket. This splined socket of the end element 62 is adapted to mechanically interfit with the splined end portion of the power output shaft S and thus provide a rotating drive connection. Securing of the shaft extension 59 to the power output shaft S can be effected by the illustrated split clamp and bolt arrangement formed with this end element. The end element 62 in this instance is thus longitudinally split along a portion of its length and is dimensioned so that a clamp bolt 63 inserted through a pair of cooperative bolt lugs is able to compress the end element around the splined power output shaft. This thus retains the shaft extension 59 in axial fixed relationship to the tractor and concurrently secures the splitter head 48 in the same relationship.

Functioning of this embodiment of the apparatus will be readily understood when considering the vertical swinging of the longitudinally extending arms 40 of the power lift mechanism. Considering the illustrated position, it will be seen that swinging of the arms in either a further elevated or a relatively depressed position, with respect to that shown, will result in swinging of the shaft 49 and the splitter head 48 carried thereon in a vertical plane. This vertical swinging, in conjunction with the movement of the support housing assembly 46, results in the base bar 54 revolving about its transverse horizontal axis to accommodate the movement and swinging of the shaft. Since the pivot points for the lifting arms 40 and the effective pivot point of the shaft 49 and its associated extension 59 are not coaxial, swinging of the lifting arms results in a relative axial displacement of the shaft 49 through its bearing elements carried in the support housing assembly 46. Thus, it will be readily seen that utilization of this mounting arrangement enables the apparatus to be positioned at any desired vertical location for optimum utilization of the splitter head and thereby forms an effective three-point mount that is capable of maintaining the desired operating position of the apparatus. Not only is an effective three-point mount formed but the shaft being supported in the relatively elongated support housing is capable of significantly reducing the ability of the lifting mechanism arms to swing or sway laterally in a horizontal plane. This mounting maintains the splitter head aligned with a relatively fixed longitudinal axis thereby substantially enhancing the stability of the splitter head and facilitating log splitting operations.

It will be readily apparent from the foregoing description of the illustrative embodiment of this invention that a particularly novel and advnatageous log splitting apparatus is provided that is exceptionally convenient to utilize. The apparatus is readily mountable on a tractor type vehicle and is conveniently transportable in a fully assembled, operational state to a utilization site. Providing of the elongated tube in the support housing assembly forms an extremely rigid bearing mount capable of withstanding the forces encountered in the splitting of logs. The log stop bar assembly is selectively positionable at a preferred angular position for convenience of the operator and rigidly maintains the elongated stop bar in parallel relationship to the conical surface of the splitter head. The telescopic mount of the stop bar enables adjustment of the throat width to better accommodate deficient different sizes of logs. In the second embodiment of the apparatus designed for mounting on a tractor lifting mechanism, it will be seen that this apparatus is also capable of convenient transportation in a fully operational state, and additionally, is readily positioned at a preferred height for convenience of the operator. Furthermore, the second embodiment is readily mounted on a tractor having a conventional three-point mount but minimizes cost as the drive shaft is also utilized in forming the mounting attachment.

Having thus described this invention, what is claimed is:

1. A log splitting apparatus comprising a splitter head assembly including a splitter head having a spiral thread formed on a conical surface, an elongated supporting drive shaft projecting axially from a base of the splitter head, and shaft coupling means provided on said drive shaft in relatively remote relationship to said splitter head for mechanical coupling thereof with a power source, a support housing assembly including an elongated tube having bearing means in which said drive shaft is journalled in axially extending relationship with the splitter head projecting axially with respect to one end of said tube and the shaft coupling means at the opposite end thereof, and mounting means attached to said tube for mounting thereof on a power source and effecting engagement of said drive shaft coupling with the power source in driving relationship, and a log stop bar assembly including an elongated bar and support means for said bar, said support means being rotatably mounted on said support housing tube for angular displacement relative thereto and supporting said bar in axially extending, laterally spaced relationship to said splitter head for defining a throat in combination with said splitter head for passage of a log therethrough, and securing means on said support means and said support housing respectively for locking the same in selective relative angular positions.

2. A log splitting apparatus according to claim 1 wherein said support housing tube is cylindrical and the support means of said log stop bar assembly includes a circular collar mounted on said cylindrical tube for relative rotation, said collar and said support housing tube being provided with said securing means for securing said stop bar assembly in fixed relationship to said support housing assembly.

3. A log splitting apparatus according to claim 2 wherein said securing means comprises a set screw threaded into said circular collar and extendible into a socket formed in said support housing tube, said support housing tube having a plurality of such sockets formed in angularly spaced relationship around the periphery thereof.

4. A log splitting apparatus according to claim 2 wherein the support means of said log stop bar assembly includes a telescopic tube mechanism having a first element secured to said circular collar and projecting radially outward relative thereto and a second element selectively positionable on said first element in secured relationship at a predetermined radially displaced position, said elongated bar secured to said second element.

5. A log splitting apparatus according to claim 4 wherein the first and second elements of said telescopic tube mechanism are elongated tubes with the second element axially slideable over the first element and said telescopic tube mechanism includes securing means for cooperatively interengaging with said elements to secure the elements in fixed relationship.

6. A log splitting apparatus according to claim 5 wherein said securing means includes a plurality of apertures spaced longitudinally along said first element, an aperture formed in said second element to align with a selected aperture of said first element, and a fastening device cooperatively interengageable with a set of aligned apertures.

7. A log splitting apparatus according to claim 1 wherein the support means of said log stop bar assembly includes a supporting bar projecting radially outward from said support housing assembly tube and having said elongated bar mounted thereon at a selected radially displaced position.

8. A log splitting apparatus according to claim 7 wherein said supporting bar extends in a downwardly inclined direction.

9. A log splitting apparatus according to claim 8 wherein said supporting bar extends in a forwardly inclined direction with the angle of forward inclination is substantially equal to the taper of said splitter head with said elongated bar secured to said supporting bar in perpendicular relationship thereto.

10. A log splitting apparatus according to claim 7 wherein said elongated bar extends parallel to the conical surface of said splitter head.

11. A log splitting apparatus according to claim 7 wherein said elongated bar projects a distance forwardly of said splitter head.

12. A log splitting apparatus according to claim 1 wherein said mounting means of the support housing assembly is adapted to mechanically couple with a structural element of the power source in fixed relationship thereto.

13. A log splitting apparatus according to claim 12 wherein said mounting means is a bolt flange.

14. A log splitting apparatus according to claim 13 wherein said support housing assembly includes an elongated tube in which said drive shaft is journalled and said bolt flange is secured to one end thereof.

15. A log splitting apparatus comprising a splitter head assembly including a splitter head having a spiral thread formed on a conical surface, an elongated supporting drive shaft projecting axially from a base of of the splitter head, and shaft coupling means provided on said drive shaft in relatively remote relationship to said splitter head for mechanical coupling thereof with a power source, a support housing assembly including an elongated tube having drive shaft bearing means mounted therein and which permit relative axial displacement of said drive shaft with respect to said elongated tube, and an elongated base bar secured to said elongated tube in transversely extending relationship to a longitudinal axis of said tube, said base bar having trunions provided at each end thereof for supporting the base bar for revolution about its longitudinal axis, and a log stop bar assembly including an elongated bar and support means for said bar, said support means mounted on said support housing and supporting said bar in axially extending, laterally spaced relationship to said splitter head for defining a throat in combination with said splitter head for passage of a log therethrough.

16. A log splitting apparatus according to claim 15 including in combination therewith, a vehicular power source having a structural frame, a power output shaft projecting a distance outwardly from said frame and a lifting mechanism which includes a pair of elongated lifting arms that are pivotally mounted at one end on said structural frame and extend a distance outwardly therefrom for swinging movement in a vertical plane, said lifting arms being mounted on respectively opposite sides of said power output shaft in laterally spaced relationship thereto with each arm having a respective trunion of said base bar journalled thereon.

17. A log splitting apparatus according to claim 16 wherein said lifting mechanism includes means selectively operable to pivot said lifting arms to a selected position.

18. A log splitting apparatus according to claim 16 wherein said drive shaft coupling means is secured to said power output shaft to prevent relative axial displacement thereof and includes a swivel joint permitting angular displacement of said drive shaft to axis of rotation of said power output shaft.

* * * * *